Oct. 6, 1964  S. V. MANSON  3,151,449
ROCKET NOZZLE COOLING SYSTEM
Filed Aug. 25, 1961  2 Sheets-Sheet 1

INVENTOR.
SIMON V. MANSON
BY *Victor D. Behn*
ATTORNEY

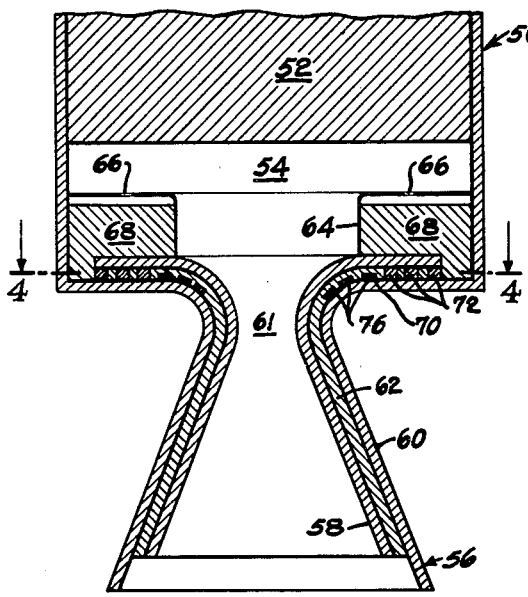
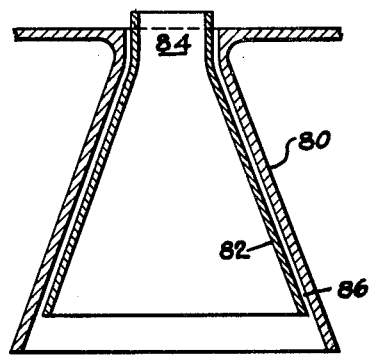
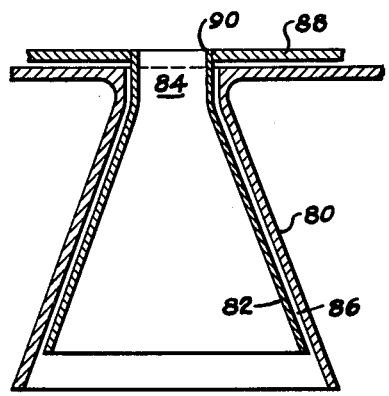
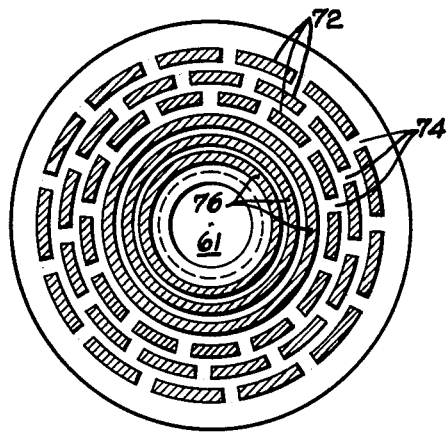

United States Patent Office 3,151,449
Patented Oct. 6, 1964

3,151,449
ROCKET NOZZLE COOLING SYSTEM
Simon V. Manson, East Orange, N.J., assignor to Curtiss-Wright Corporation, a corporation of Delaware
Filed Aug. 25, 1961, Ser. No. 133,904
8 Claims. (Cl. 60—35.6)

This invention relates to nozzles for rockets and other types of jet engines and is more particularly directed to a nozzle construction for solid fuel rocket engines embodying means for cooling the walls of the nozzle.

In the case of rockets and other jet engines using liquid fuels it is a common expedient to use the engine fuel as a coolant for the discharge nozzle for the engine exhaust gases. In the case of solid fuel rockets, however, the fuel is not readily suitable for use as a nozzle coolant. Accordingly the invention is particularly applicable to solid fuel rockets and is herein described in connection with such rockets. As will be apparent, however, the invention is also applicable to the exhaust nozzles of other types of jet engines.

Solid fuel rockets for missiles and space vehicles are being designed for use with new fuels, the combustion temperatures of which are so high that the provision of more effective means for cooling the walls of the rocket exhaust nozzle is of utmost importance.

An object of the invention resides in the provision of a novel and effective means of cooling the walls of a jet engine exhaust nozzle.

A further object of the invention comprises the provision of a nozzle wall coolant system for jet engines in which a metal coolant in the liquid state is forced to flow through a passage in said nozzle wall and to boil in said passage before discharging therefrom into the flow path of the exhaust gases.

A still further object of the invention comprises the provision of a novel arrangement for cooling the walls of a jet engine exhaust nozzle by forcing coolant to flow through a passage within said nozzle wall either from the upstream end of said nozzle wall toward its downstream end, or from the downstream to the upstream end of the nozzle, such that said coolant boils in said nozzle wall passage although it enters said passage in the liquid state.

Another object of the invention resides in the provision of means to regulate the coolant flow through the nozzle wall passage substantially independently of the flow resistance provided by boiling of the coolant in said passage.

The use of liquid metals as a coolant for the walls of a jet engine exhaust nozzle is already known. The present invention provides a novel arrangement utilizing a liquid metal, such as lithium, as the coolant for such a nozzle. In accordance with the invention the metal coolant is stored in a reservoir and when the engine is operated the metal coolant is melted and supplied under pressure for flow through a passage between the inner and outer walls of a nozzle. The liquid metal coolant is forced to flow along this coolant passage toward the downstream end of said nozzle coolant passage, thereby cooling the inner wall of the nozzle. The coolant flow rate preferably is such that it boils in said nozzle coolant passage before reaching the end of said passage, the coolant discharging from the end of the passage as a liquid and gas mixture. For the case in which the coolant flows from the upstream end of the nozzle toward the downstream end, the nozzle inner wall preferably terminates short of the downstream end of the nozzle and the metal coolant as it discharges from said nozzle coolant passage flows along the adjacent portion of the said nozzle outer wall to protect said wall from the hot exhaust gases of the engine. With this feature the exhaust gas pressure in the nozzle at the point of discharge of the coolant therein serves to provide a back pressure for the coolant, thereby raising its boiling pressure within the nozzle coolant passage.

Another feature of the invention resides in the provision of a relatively large resistance to the coolant flow upstream of the nozzle channel proper. This may be an annular restriction at the upstream end of the annular entrance to the coolant flow passage in the nozzle wall. Such a flow restriction serves to insure uniform flow of coolant around the annular entrance to the nozzle wall passage and in addition is sufficiently small to control the flow of coolant through the nozzle wall passage. This latter function is important because the initiation of boiling of the coolant in the nozzle wall passage results in an increasing resistance to cooling flow through said passage which, in the absence of said flow restriction, would reduce the coolant flow to produce more boiling of coolant, thereby further reducing the coolant flow.

Various metals of suitable boiling points, such as lithium, sodium, potassium and mixtures thereof, could be used as the metal coolant. Lithium is preferred, however, because of its high thermal capacity.

Other objects of the invention will become apparent upon reading the annexed detail description in connection with the drawing in which:

FIG. 3 is a schematic axial sectional view through the exhaust end of a single nozzle solid fuel rocket embodying a modified form of the invention;

FIG. 4 is a view taken along line 4—4 of FIG. 3 but without the metal coolant; and FIGS. 5 and 6 are axial sectional views of a nozzle illustrating steps in the fabrication of a hollow double wall nozzle.

Figure 1:
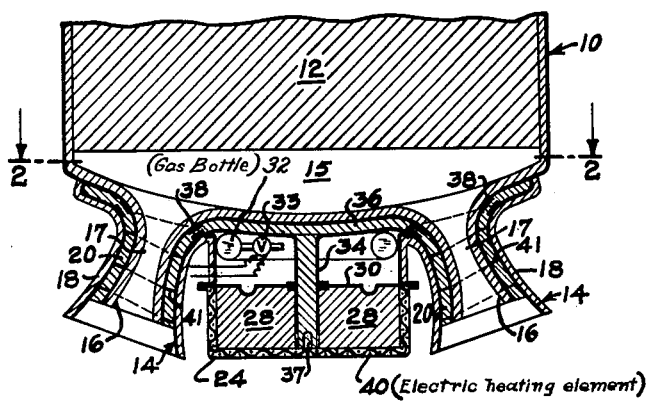
FIG. 1 is a schematic axial sectional view through the exhaust end of a multi-nozzle solid fuel rocket embodying the invention.
Figure 2:
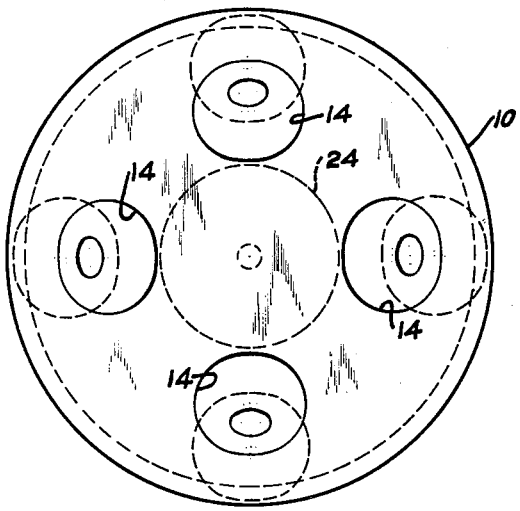
FIG. 2 is a view taken along line 2—2 of FIG. 1.

Referring first to FIGS. 1 and 2 of the drawing, a solid fuel rocket engine 10 is illustrated as being loaded with a solid fuel 12 and having a plurality of exhaust nozzles 14 (four as illustrated) circumferentially spaced about the rear end of the rocket combustion chamber 15.

Each nozzle 14 has the usual convergent-divergent profile having a throat region 17. Also each nozzle has a hollow double wall construction such that it has an inner wall 16 and an outer wall 18 spaced therefrom and forming an annular space or passage 20 therebeween. The upstream portion of the inner and outer nozzle walls 16 and 18 are co-extensive but, as illustrated, the inner wall may preferably terminate short of the downstream end of the nozzle although preferably it extends a substantial distance downstream of the nozzle throat 17.

A storage reservoir or container 24 for the metallic coolant is supported at the rear end of the rocket combustion chamber between the circle of nozzles 14. A metallic coolant 28, such as lithium, is stored in the rear portion of the reservoir 24 behind a flexible diaphragm 30. An annular high pressure bottle 32 of an inert gas, such as argon, is stored on the other side of the diaphragm, said bottle having a solenoid controlled discharge valve 33 which when open admits high pressure inert gas to the forward portion of the reservoir for pressurizing the metallic coolant 28 in the reservoir 24.

The reservoir 24 includes a discharge conduit 34 which extends forwardly from the bottom or rear wall of the reservoir to a anifold 36 which is disposed across the rear end of the rock combustion chamber 15 and communicates with the annular entrance to each nozzle passage 20. Openings 37 are provided in the rear end of the conduit 34 for flow of the metallic coolant 28 therein to the manifold 36. An annular or equivalent restriction 38 is provided upstream of or at the entrance portion of each nozzle passage 20 from the manifold 36.

In addition to the reservoir 24 being filled with the metallic coolant 28, the conduit 34, manifold 36 and nozzle passage 20 are, as illustrated, also filled with said metallic coolant.

When the rocket is in storage awaiting use, the metallic coolant 28 is in the solid state. The reservoir 24, however, is provided with heating means 40, such as an electric heating element, which surrounds the portion of the reservoir containing the metallic coolant. When the rocket is to be fired the electric heating element 40 is first energized to provide sufficient heat to melt the metallic coolant within said reservoir.

After the coolant 28 in the reservoir 24 has been melted and the rocket is otherwise ready, the rocket fuel 12 is ignited and the solenoid valve 33 is opened to pressurize the now liquid metallic coolant 28. The rocket combustion gases in the combustion chamber 15 discharge therefrom through the rocket nozzles 14 to provide the rocket thrust. The heat from the combustion gases melts the metallic coolant in the manifold 36 and nozzle passages 20 whereupon the gas pressure in the reservoir 24 is effective to force the metallic liquid coolant 28 up through the reservoir conduit 34, through the manifold 36 and the nozzle passages 20 to cool the inner wall 16 of each nozzle passage 20 against the heat of the rocket exhaust gases.

The annular flow restriction 38 at the entrance to each nozzle passage 20 serves to insure uniform flow of the coolant into said passage 20 around the entire annular entrance to said passage. In addition, the annular flow restriction 38 or equivalent at the entrance to each nozzle passage 20 serves to regulate the rate of coolant flow therethrough. Each restriction 38 is of a size to produce a coolant flow rate such that the heat absorbed by the coolant from the combustion gases causes the coolant to boil in each nozzle passage 20 preferably at a point downstream of the nozzle throat. Also the flow rate of the coolant preferably is such that it is substantially but not completely vaporized as it emerges from a nozzle passage 20 at the downstream end of the nozzle inner wall 16.

By having the inner wall 16 of each nozzle 14 terminate short of the discharge end of the nozzle so that the nozzle coolant passage 20 opens into the flow path of the nozzle exhaust gases upstream of the discharge end of the nozzle, the pressure at the exit end of each nozzle coolant passage 20 is greater than that of the surrounding atmosphere and therefore is greater than what said exit pressure would be if the coolant passage 20 continued to the discharge end of the nozzle or if said passage discharged directly into the surrounding atmosphere. This above-atmospheric pressure at the discharge end of each nozzle coolant passage 20 correspondingly raises the coolant pressure within the nozzle collant passage 20 thereby increasing both the boiling point and the peak heat flux acceptable by the coolant within said passage to increase its cooling effectiveness.

As the metallic coolant discharges from a nozzle passage 20 it flows along the remaining portion of outer wall 18 of the nozzle to provide a film or layer which insulates the otherwise exposed portion of the nozzle outer wall from the hot exhaust gases. It should be noted that the heat transfer coefficient of the rocket exhaust gases decreases as said gases flow through the nozzle so that the cooling requirements for the nozzle wall structure are much less at the downstream end of the nozzle.

In order to insure uniform cooling around each exhaust nozzle, its coolant passage 20 may be partitioned by a spiral wall such as 41 so that the coolant flows along a spiral path around each nozzle passage 20 as said coolant proceeds axially toward the discharge end of the nozzle. This arrangement minimizes danger of hot spots forming on one side of the nozzle as a result of too little coolant flow on this nozzle side. Alternately, the coolant may be caused to flow from the downstream end of the nozzle toward the upstream end to assure good coolant distribution.

As described, the metallic coolant stored in the rocket prior to firing the rocket not only fills the reservoir 24 but also fills all the passages leading to the nozzle coolant passages 20 as well as said nozzle passages and although special electric heating means 40 are provided to melt the coolant in the reservoir the remaining coolant is melted by heat from the rocket combustion gases. If desired, however, special electric heating means may be provided to initially melt all the metallic coolant prior to firing the rocket. With this latter arrangement an annular plug (not shown), also of low melting point metal, may be placed across the discharge end of each nozzle passage 20 so that said plug is only melted by the heat of the combustion gases whereby said plug would prevent premature flow of the metal coolant out from the discharge end of a nozzle coolant passage 20.

The radial width of each metal coolant passage 20 should be as small as possible from a fabrication standpoint whereby for a given quantity of coolant flow, the velocity of flow is a maximum thereby increasing the cooling effectiveness of said quantity of coolant. Thus, with a given quantity of metal coolant, a nozzle passage having a radial width within the range of 0.025 to 0.060 inches was considered to be satisfactory. A smaller radial width of passage results in excessive fabrication difficulties. On the other hand, if the radial width of a nozzle coolant passage 20 is made larger than 0.060 inches then the heat transfer capability of the coolant may be impaired or an unnecessarily large quantity of coolant may be required to flow through the nozzle coolant passage to provide a satisfactory velocity of flow for the coolant. In this latter case the flow area of the restricted region 38 would have to be increased to decrease its resistance to flow so as to increase the coolant flow rate. If the rocket is to be operated for a given period of time, any increase in the coolant flow rate obviously would mean that a greater volume of coolant would have to be initially stored in the rocket, thereby correspondingly decreasing the useful weight which could be carried by the rocket. It is apparent, therefore, that the radial dimension of each nozzle coolant passage 20 should be as small as practical from a fabrication standpoint. A radial dimension of 0.045 inches for a coolant passage 20 is preferred.

During rocket operation, when the coolant starts to boil in a nozzle passage 20 the flow resistance of said nozzle passage increases. In the absence of the restriction 38 for regulating the flow through said passage 20 such boiling in the nozzle passage would produce a relatively large decrease in the flow rate of the metallic coolant through said passage. Any decrease in the coolant flow rate would produce an increase in the coolant boiling, thereby further decreasing the coolant flow rate.

Since the reservoir discharge conduit 34 extends to the bottom or rear portion of the reservoir 24 the acceleration forces on the metallic coolant 28 in the reservoir help to pump the metallic coolant out the reservoir through said conduit.

As illustrated in FIG. 1, a common reservoir 24 of liquid coolant is provided for the plurality of nozzles 14. Obviously, however, each nozzle 14 may be provided with its individual coolant reservoir which for example could be annular and mounted on and about its associated nozzle.

In the embodiment of FIGS. 1 and 2 a separate source of gas under pressure is used to pump the metallic nozzle coolant through the nozzle passage within the walls of each nozzle. It is also possible, however, to utilize the pressure of the rocket combustion gases as the gas pressure for forcing flow of the metallic coolant through each nozzle coolant passage. Such an arrangement is illustrated in FIGS. 3 and 4.

In FIGS 3 and 4 a rocket engine 50 containing a solid fuel 52 is illustrated as having a combustion chamber 54 with a single exhaust nozzle 56 extending rearwardly from the combustion chamber 54. The nozzle 56 consists of an inner wall or sleeve 58 and an outer wall 60 spaced from the inner wall to form a passage 62 therebetween. Said inner wall 58 preferably terminates short of the downstream end of the nozzle but extends downstream of the nozzle throat 61. An annular reservoir 64 is formed about the annular entrance to the nozzle 56 from the combustion chamber and is disposed in communication with the nozzle coolant passage 62. The forward wall of the reservoir 64 has one or more openings 66 for pressurizing the metallic coolant 68, such as lithium, stored in the reservoir. If desired, a flexible diaphragm (not shown) may extend across the reservoir 64 to prevent actual contact of the rocket combustion gases with the metallic coolant 68. The metallic coolant stored in the rocket 50 not only fills the reservoir 64 but also fills the coolant passage 62.

As in FIGS. 1 and 2 an annular restriction 70 may be disposed at the entrance to the nozzle coolant passage 62 for regulating the coolant flow. Flow restrictors of other than annular shape could also be used. The flow restriction must be sufficiently small to reduce the coolant flow rate to the value desired. On the other hand, the flow restriction should not be so small that there is danger of the flow restriction becoming clogged. This is particularly so when as in FIGS. 3–4 the high pressure of the rocket combustion chamber is used as the motivating force for pumping the liquid coolant. Accordingly in FIGS. 3–4 the single flow restriction 38 of FIGS. 1–2 is replaced by the more complex means 70 for restricting the coolant flow.

As best seen in FIG. 4 the flow restriction 70 consists of a plurality of interrupted annular rings 72 spaced along the general direction of flow of the metallic coolant, said rings blocking the flow of coolant except for a plurality of circumferentially spaced gaps 74 in each ring. The gaps 74 of adjacent rings 72 are circumferentially staggered as illustrated. Following the interrupted rings 72 are a plurality of continuous rings 76 also spaced along the general direction of flow of the coolant.

In flowing from the reservoir 64 the coolant must flow through the staggered gaps 74 whereby a substantial flow resistance is provided. Each of the continuous rings 76 provides further flow resistance. The coolant flow obviously is quite non-uniform circumferentially as the coolant leaves each of the interrupted rings 72. The continuous flow restricting rings 76, however, serve to redistribute the metal coolant circumferentially to provide for a uniform circumferential distribution as the metal coolant enters the nozzle coolant passage 62 downstream of the restriction 70.

As previously stated, other forms of flow restrictors located upstream of each nozzle could be employed as alternates to the annular restrictor.

In the embodiment of FIGS. 3–4, when the rocket is fired, heat from the combustion gases serves to melt the metallic coolant 68 and the pressure of said gases acts through the reservoir openings 66 to pump the liquid metallic coolant out from the reservoir through the nozzle passage 62 to cool the inner wall of the nozzle against the heat of the combustion gases. As in FIGS. 1–2, the flow restriction 70 in FIGS. 3–4 preferably is of such magnitude that the coolant boils in the nozzle passage 62 downstream of the nozzle throat.

The nozzle inner wall or sleeve 58 preferably extends into the reservoir 64 to a point adjacent to but short of the radially outer wall of the reservoir. With this arrangement, as the coolant is forced to flow out of the reservoir 64 no gap is formed between the coolant and the radially inner wall of the reservoir. Hence, during rocket operation heat from the combustion gases is continually conducted directly from the inner wall of the reservoir to the metallic coolant therein to maintain the metallic coolant in the reservoir in the liquid state.

If desired, each of the flow restrictions 38 in FIGS. 1 and 2 could be replaced by a series of flow restrictions similar to the flow restricting means 70 in FIGS. 3–4, or by other forms of flow resistance.

As already stated, the coolant passage between the inner and outer walls of each nozzle, FIGS. 1–2 or in FIGS. 3–4, should have a radial dimension which is as small as practical from a fabrication standpoint. FIGS. 5 and 6 illustrate one possible way of fabricating such a double wall structure although the invention obviously is not limited to this method of fabrication.

As illustrated in FIGS. 5–6, a nozzle outer shell or wall 80 is first fabricated. The nozzle inner shell or wall 82 is then fabricated with a straight throat section 84. The inner shell or wall 82 is positioned within the outer shell so as to leave a passage 86 of the desired radial width between said walls. A suitable annular flange 88 (FIG. 6) is then secured to the upstream end of the inner shell 82, for example, as by brazing, welding, a shrink fit or other suitable means to complete the double wall nozzle with a passage of desired radial width between said nozzle walls 80 and 82. Thereafter the upstream end corner 90 of the inner surface of the wall is preferably rounded (not shown) to provide a streamline entrance for the combustion gases into the nozzle.

While I have described my invention in detail in its present preferred embodiment, it will obvious to those skilled in the art, after understanding my invention, that various modifications may be made therein without departing from the spirit or scope thereof. I aim in the appended claims to cover all such modifications.

I claim as my invention:

1. In combination with a jet engine having an exhaust nozzle having a single throat and providing a continuous discharge flow path for the engine exhaust gases; said nozzle having a pair of spaced and substantially parallel inner and outer annular walls to provide a hollow wall construction for a coolant annular flow passage between said annular walls for flow through said annular hollow wall passage from one end thereof to the other; a reservoir having a passage connection with said annular hollow wall passage, said reservoir containing a metallic coolant which is solid at normal room temperatures; means for melting and pressurizing said coolant in said reservoir for flow therefrom through said annular hollow wall passage during engine operation and thence into the flow path of the exhaust gases and means providing an annular flow restriction co-axial with the upstream end of said annular hollow wall passage and deposed between said reservoir and annular hollow wall passage to allow continuous flow of coolant through said restriction.

2. The combination claimed in claim 1 and in which said reservoir is disposed laterally of the exhaust gas flow path of said nozzle and said reservoir passage connection extends forwardly from a point adjacent to the rear end of said reservoir to the entrance of the hollow wall nozzle passage.

3. The combination claimed in claim 1 and including means for utilizing the engine combustion gases to pressurize and melt the coolant in said reservoir.

4. The combination claimed in claim 1 and in which the inner wall of said nozzle is co-extensive with the upstream portion of the nozzle but terminates short of the downstream end of the nozzle but closer to the downstream end than to the throat for the flow of coolant out of the downstream end of the hollow wall passage and along said outer nozzle wall downstream of said inner wall.

5. The combination claimed in claim 1 and in which the radial distance between the inner and outer walls of the nozzle annular hollow wall passage is no greater than 0.060 inch.

6. In combination with a jet engine having an exhaust nozzle having a single throat and providing a continuous discharge flow path for the engine exhaust gases; said nozzle having a pair of spaced and substantially parallel inner and outer annular walls to provide a hollow wall construction for a coolant flow passage between said walls; a reservoir having a passage connection with said hollow wall passage, said reservoir containing a metallic coolant which is solid at normal room temperatures; and means for melting and pressurizing said coolant in said reservoir for flow therefrom through said hollow wall passage during engine operation and thence into the flow path of the exhaust gases, said coolant pressurizing means comprising a source of fluid pressure and said coolant melting means comprising electric heating means.

7. In combination with a solid fuel rocket engine having a plurality of exhaust nozzles circumferentially spaced at the rear end of the rocket engine with each nozzle having a single throat and each providing a continuous discharge flow path for the engine exhaust gases; each said nozzle having a pair of spaced and substantially parallel inner and outer annular walls to provide a hollow wall construction for a coolant flow passage between said walls; a reservoir disposed laterally of the exhaust gas flow paths of said nozzles and having a passage connection with the hollow wall passage of each of said nozzles, said reservoir containing a metallic coolant which is solid at normal room temperature; and means for melting and pressurizing said coolant in said reservoir for flow therefrom through each said nozzle hollow wall passages during engine operation and thence into the flow path of the nozzle exhaust gases, said coolant pressurizing means comprising a source of fluid pressure and said coolant melting means comprising electric heating means.

8. The combination claimed in claim 7 and in which the passage connection from said reservoir extends forwardly from a point adjacent to the rear end of said reservoir to the upstream ends of the hollow wall nozzle passages.

References Cited in the file of this patent

UNITED STATES PATENTS

| | | |
|---|---|---|
| 916,726 | Lake | Mar. 30, 1909 |
| 2,354,151 | Skoglund | July 18, 1944 |
| 2,445,856 | Mayer | July 27, 1948 |
| 2,476,185 | Goddard | July 12, 1949 |
| 2,770,097 | Walker | Nov. 13, 1956 |
| 2,916,873 | Walker | Dec. 15, 1959 |
| 3,026,806 | Runton et al. | Mar. 27, 1962 |